United States Patent
Harris et al.

(10) Patent No.: US 12,548,965 B2
(45) Date of Patent: Feb. 10, 2026

(54) LASER-ENHANCED CHEMICAL VAPOR DEPOSITION

(71) Applicant: River Electro-Optics, LLC, Denver, CO (US)

(72) Inventors: Rodney S. Harris, Denver, CO (US); Stephen G. Topping, Portland, OR (US)

(73) Assignee: RIVER ELECTRO OPTICS, LLC, Lisle, IL (US)

( * ) Notice: Subject to any disclaimer, the term of this patent is extended or adjusted under 35 U.S.C. 154(b) by 432 days.

(21) Appl. No.: 18/146,409

(22) Filed: Dec. 26, 2022

(65) Prior Publication Data
US 2023/0203660 A1   Jun. 29, 2023

Related U.S. Application Data

(60) Provisional application No. 63/294,490, filed on Dec. 29, 2021.

(51) Int. Cl.
| | |
|---|---|
| *C23C 16/48* | (2006.01) |
| *C23C 16/02* | (2006.01) |
| *C23C 16/44* | (2006.01) |
| *H01S 3/04* | (2006.01) |
| *H01S 3/08* | (2023.01) |
| *H01S 3/083* | (2006.01) |
| *H01S 3/16* | (2006.01) |
| *H01S 3/23* | (2006.01) |

(52) U.S. Cl.
CPC ........ *C23C 16/483* (2013.01); *C23C 16/0263* (2013.01); *C23C 16/4412* (2013.01); *H01S 3/0407* (2013.01); *H01S 3/08059* (2013.01); *H01S 3/083* (2013.01); *H01S 3/1685* (2013.01); *H01S 3/2308* (2013.01)

(58) Field of Classification Search
CPC .............. C23C 16/483; C23C 16/0263; C23C 16/4412; H01S 3/0407; H01S 3/08059; H01S 3/083; H01S 3/1685; H01S 3/2308
USPC ......................................... 118/715
See application file for complete search history.

(56) References Cited

U.S. PATENT DOCUMENTS

| | | | |
|---|---|---|---|
| 5,148,496 A | 9/1992 | Anderson | |
| 6,110,291 A * | 8/2000 | Haruta | C23C 14/28 427/596 |
| 2006/0062912 A1* | 3/2006 | Wortman | C23C 28/3455 118/726 |

(Continued)

OTHER PUBLICATIONS

Topping, Stephen G., et al. 'CVD Lu2O3:Eu coatings for Advanced Scintillators'; Materials Science and Engineering, Boston University, Brookline, MA 02446, USA.

(Continued)

*Primary Examiner* — Charlee J. C. Bennett
(74) *Attorney, Agent, or Firm* — RIVER ELECTRO-OPTICS, LLC; Rodney S. Harris; Stephen Topping

(57) ABSTRACT

A laser-enhanced chemical vapor deposition transport system includes a resistive heated crucible and, projecting from the crucible at a first end, a plurality of spokes. The spokes are configured to deliver, substantially simultaneously, vaporized and/or sublimated media powder from the crucible to a plurality of deposition sites, deliver precursor gasses to the deposition sites and propagate beams emitted from one or more laser sources to the deposition sites.

19 Claims, 5 Drawing Sheets

(56) References Cited

U.S. PATENT DOCUMENTS

| | | | | |
|---|---|---|---|---|
| 2008/0073324 | A1* | 3/2008 | Nogami | H01L 21/6838 |
| | | | | 156/345.37 |
| 2010/0079760 | A1* | 4/2010 | Bernacki | G02B 17/004 |
| | | | | 359/838 |
| 2012/0222818 | A1* | 9/2012 | Sakata | H01L 21/67109 |
| | | | | 165/104.11 |
| 2012/0272892 | A1* | 11/2012 | Paranjpe | C30B 35/00 |
| | | | | 118/724 |
| 2013/0260501 | A1* | 10/2013 | Sonoda | H10K 50/844 |
| | | | | 438/46 |
| 2016/0340783 | A1* | 11/2016 | Lu | C23C 16/303 |
| 2017/0009334 | A1* | 1/2017 | Ciraldo | C03C 17/3417 |
| 2020/0159107 | A1* | 5/2020 | Kurganova | G03F 7/70916 |

OTHER PUBLICATIONS

Woohong, Kim, et.al., 'Synthesis of High Purity Yb31-Doped Lu2O3 Powder for High PowerSolid-State Lasers'; Naval Research Laboratory, Washington, D.C. 20375; 2011.

Odusanya, Abiodun Ademola; 'Development of a Laser-Assisted Chemical Vapor Deposition (CVD) Technique to Grow Carbon-Based Materials'; MSU Graduate Thesis; May 2021; Missouri State University; Springfield, Missouri, US.

Pierson, Hugh O.; 'Handbook of Chemical Vapor Deposition—Principles, Technology and Applications'; Second Edition; 1999; Noyes Publications / William Andrew Publishing, LLC; Norwich, NY, US.

Allen, S.D., 'Laser Chemical Vapor Deposition: A Technique for Selective Area Deposition', Jul. 17, 1981, Center for Laser Studies, University of Southern California, University Park, Los Angeles, CA, Jul. 17, 1981.

* cited by examiner

LASER-ENHANCED CHEMICAL VAPOR DEPOSITION

CROSS-REFERENCE TO RELATED APPLICATIONS

This application claims the priority benefit of U.S. Provisional Application No. U.S. 63/294,490 filed on 29 Dec. 2021, which is incorporated herein by reference in its entirety.

SUMMARY

The disclosure describes a laser-enhanced chemical vapor deposition reactor. The laser-enhanced chemical vapor deposition reactor includes a plurality of laser sources, a resistive-heated crucible and a plurality of spokes each projecting from the crucible from a first end. The spokes each include at least one precursor gas bore configured to carry precursor gasses to a second end distal from the first end, at least one media vapor bore configured to carry media vapor from the crucible to the second end, a laser beam light pipe configured to propagate a beam emitted from the laser sources to the second end and a spreader lens at the second end configured to condition the beam into a divergent beam.

The disclosure also describes a laser-enhanced chemical vapor deposition transport system. The laser-enhanced chemical vapor deposition transport system includes a resistive heated crucible and, projecting from the crucible at a first end, a plurality of spokes. The spokes are configured to substantially simultaneously deliver vaporized and/or sublimated media powder from the crucible to a plurality of deposition sites, deliver precursor gasses to the deposition sites and propagate beams emitted from one or more laser sources to the deposition sites.

Further, the disclosure describes a method for laser-enhanced chemical vapor deposition. The method includes providing a resistive heated crucible having a plurality of spokes each projecting from a first end coupled with the crucible to a second end remote from the crucible, positioning the second ends of the spokes adjacent to deposition sites of a ring substrate, heating powdered media in the crucible to a vapor, transporting the heated media from the crucible through media vapor bores of the spokes to the second ends of the spokes with inert carrier gas, combining the heated media with precursor gasses adjacent to the deposition sites of the ring substrate, transporting the combination to the deposition sites of the ring substrate through second ends of the spokes, irradiating the deposition sites by a laser source conditioned into divergent beams by spreader lenses adjacent to the spoke second ends and coating the deposition sites of the ring substrate with the media.

BRIEF DESCRIPTION OF THE FIGURES

The summary above, as well as the following detailed description of illustrative embodiments, is better understood when read in conjunction with the appended drawings. For the purpose of illustrating the disclosure, example constructions are shown in the drawings. However, the disclosure is not limited to specific methods and instrumentalities disclosed herein. Moreover, those having ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

Figure 1:
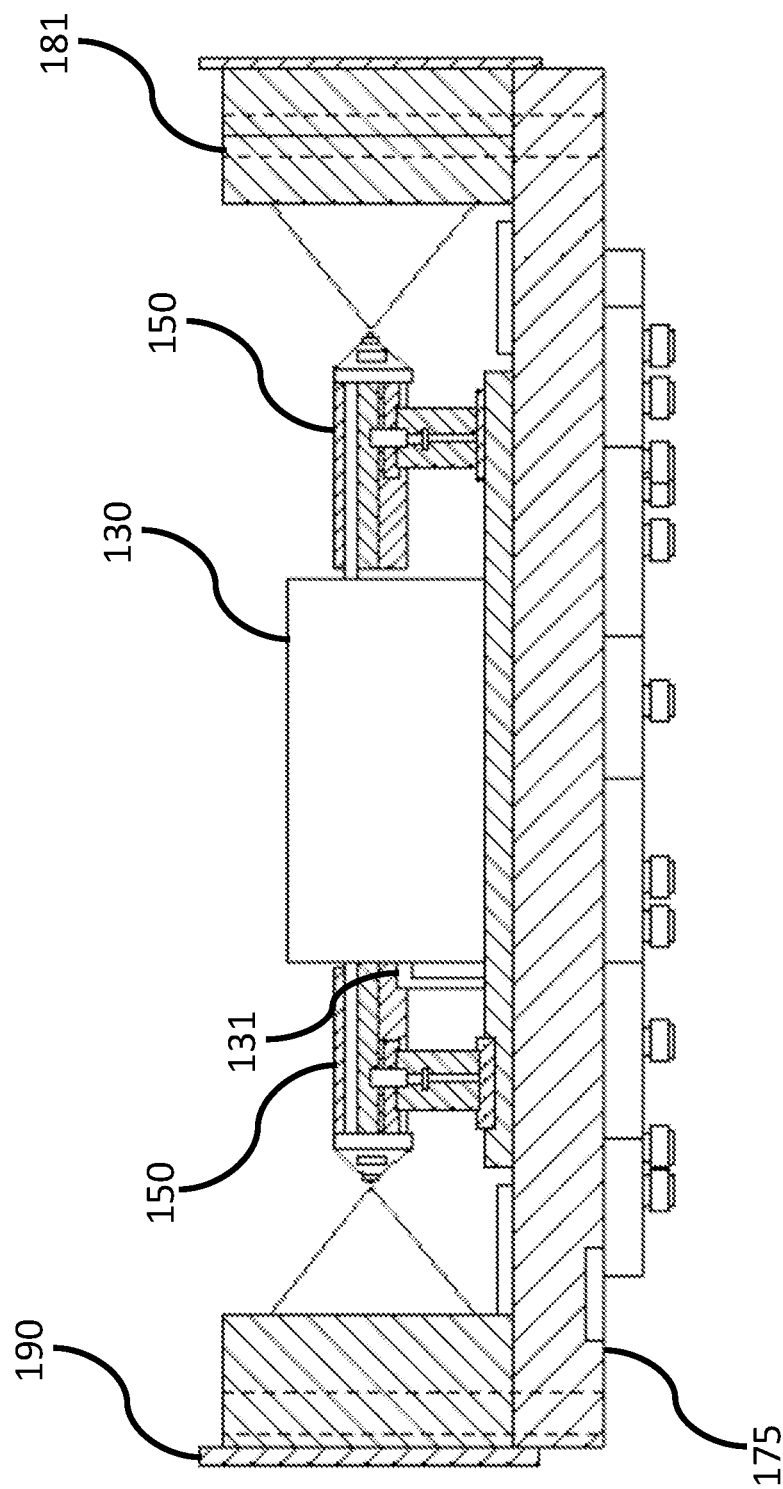
FIG. 1 illustrates a partial cross-sectional side view of an example chemical vapor deposition reactor.

The following detailed description illustrates embodiments of the disclosure and manners by which they can be implemented. Although the best mode of carrying out disclosed systems, apparatus and methods has been described, those of ordinary skill in the art would recognize that other embodiments for carrying out or practicing disclosed systems, apparatus and methods are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Existing distributed gain laser resonators use many individual laser media disks or slabs. Each must be fabricated individually adding to high fabrication and assembly cost.

Current laser disk media is fabricated either by crystalline growth or hot pressing of polycrystalline ceramic media. Disk size and material type is limited using the crystal growth method since materials with extremely high melting points do not lend themselves to crystalline growth. For example, one desirable laser media material, lutetium oxide ($Lu_2O_3$) has a melting point of 2490° C.

Depending on how they are used (such as thin disk laser applications), the disks must be individually cut, polished, coated, etc. which make them labor intensive. Subsequently they must be mounted and held in placed in the laser resonator.

As opposed to a typical thin laser disk system, polygon ring laser amplifier individual reflection points, including a laser mirror, laser media provided to the laser mirror and an anti-reflective coating provided to the laser media, are precision machined into a single resonator substrate thus eliminating the fabrication, mounting, and alignment of each individual laser disk.

The laser mirror includes layers of materials with high laser damage thresholds. In an example, the laser mirror includes layers of diamond-like carbon (Cd) and pure $Lu_2O_3$ which may be provided to a substrate ring by chemical vapor deposition. The diamond-like carbon exhibits an example refractive index of 2.418. The pure $Lu_2O_3$ exhibits a refractive index between 1.8 and 1.94. The $Lu_2O_3$ may be sintered or annealed after being provided to the substrate ring to subject the substrate to a crystallization process to improve clarity by reducing pores and grain size.

The laser media may also be provided to the laser mirror by chemical vapor deposition. The reflection points may be coated via laser-enhanced chemical vapor deposition with sesquioxide laser media which may be rare earth doped and/or polycrystalline. In an example, the laser media includes $Lu_2O_3$. In a further example, the laser media includes $Lu_2O_3$ doped with rare earth minerals and/or heavy rare earth elements both independently and as mixtures.

When laser pumped, each segment will behave like a pseudo-thin laser disk, and via distributed gain, has the potential of very large amplification capabilities. Optical components can be introduced into the beams as well, especially at the inner circle area.

Embodiments of the present disclosure substantially eliminate, or at least partially address, problems in the prior art, enabling minimized gas phase homogeneous reactions which may otherwise limit deposition rate and coating quality.

To exploit the isolated individuality of each polygon deposition site, a novel, right angled, spoked precursor transport system delivers the precursor mix only at each deposition site with transport flow perpendicular to the deposition sites.

Additional aspects, advantages, features and objects of the disclosure will be made apparent from the drawings and the detailed description of the illustrative embodiments construed in conjunction with the appended claims that follow.

It will be appreciated that described features are susceptible to being combined in various combinations without departing from the scope of the disclosure as defined by the appended claims.

Figure 2:
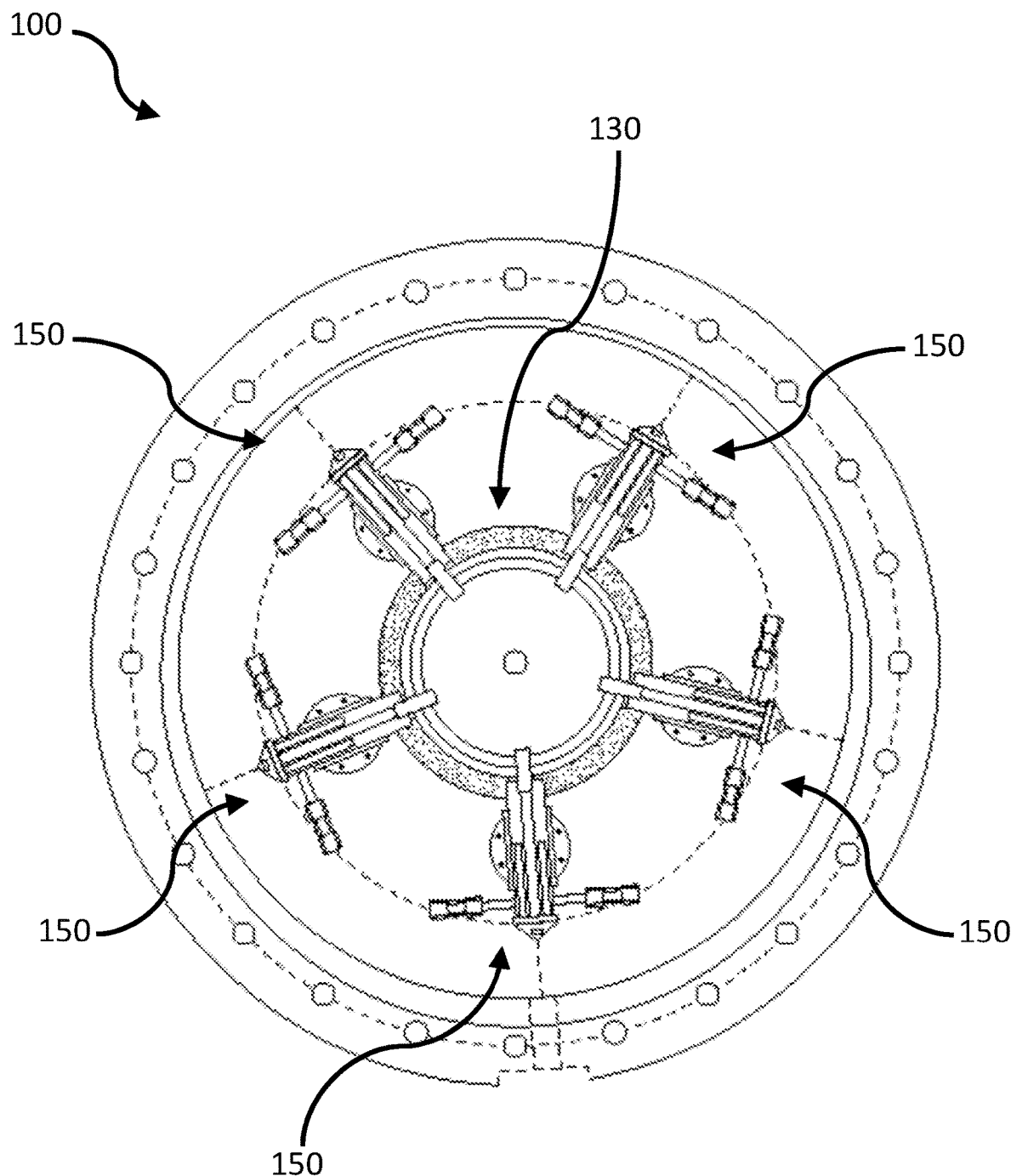
FIG. 2 illustrates an open top view of the chemical vapor deposition reactor of FIG. 1.

FIG. 1 illustrates a partial cross-sectional side view of an example laser-enhanced chemical vapor deposition reactor 100 while FIG. 2 illustrates an open top view thereof. Laser-enhanced chemical vapor deposition reactor 100 includes a resistive heated-crucible 130 at a central hub and, projecting from the crucible a number of spokes 150 having first and second ends. Together, crucible 130 and spokes 150 represent a laser-enhanced chemical vapor deposition transport system which may mitigate condensation of vapor along feed pathways and reduce the supplemental heating requirement of transport components.

Crucible 130, configured for vaporizing and/or sublimating media, is centrally located to minimize the distance media vapor travels to reaction areas. For example, the distance to deposition sites at laser mirror segments mounted to an interior surface of a substrate ring 181 may be minimized. One or more inlets 131 may be provided to crucible 130 to introduce one or more carrier gasses for transporting media vapor out of crucible 130 and into spokes 150.

Spokes 150 integrate a processing laser and precursor gas nozzle together and are configured to substantially simultaneously deliver media vapor and precursor gasses from crucible 130 to a number of deposition sites while also propagating beams emitted from one or more laser sources to the deposition sites to enhance reaction of the media vapor and precursor gasses. Delivery to the deposition sites should be sufficiently simultaneous that reactions at the deposition sites can proceed in parallel so that media thickness deposited to the sites is consistent to +/−15% between the sites over the same process time. Arrival of media vapor, precursor gasses and laser beams at the deposition sites should be sufficiently simultaneous to enable the reactions necessary for depositing the media at the sites.

Figure 3:
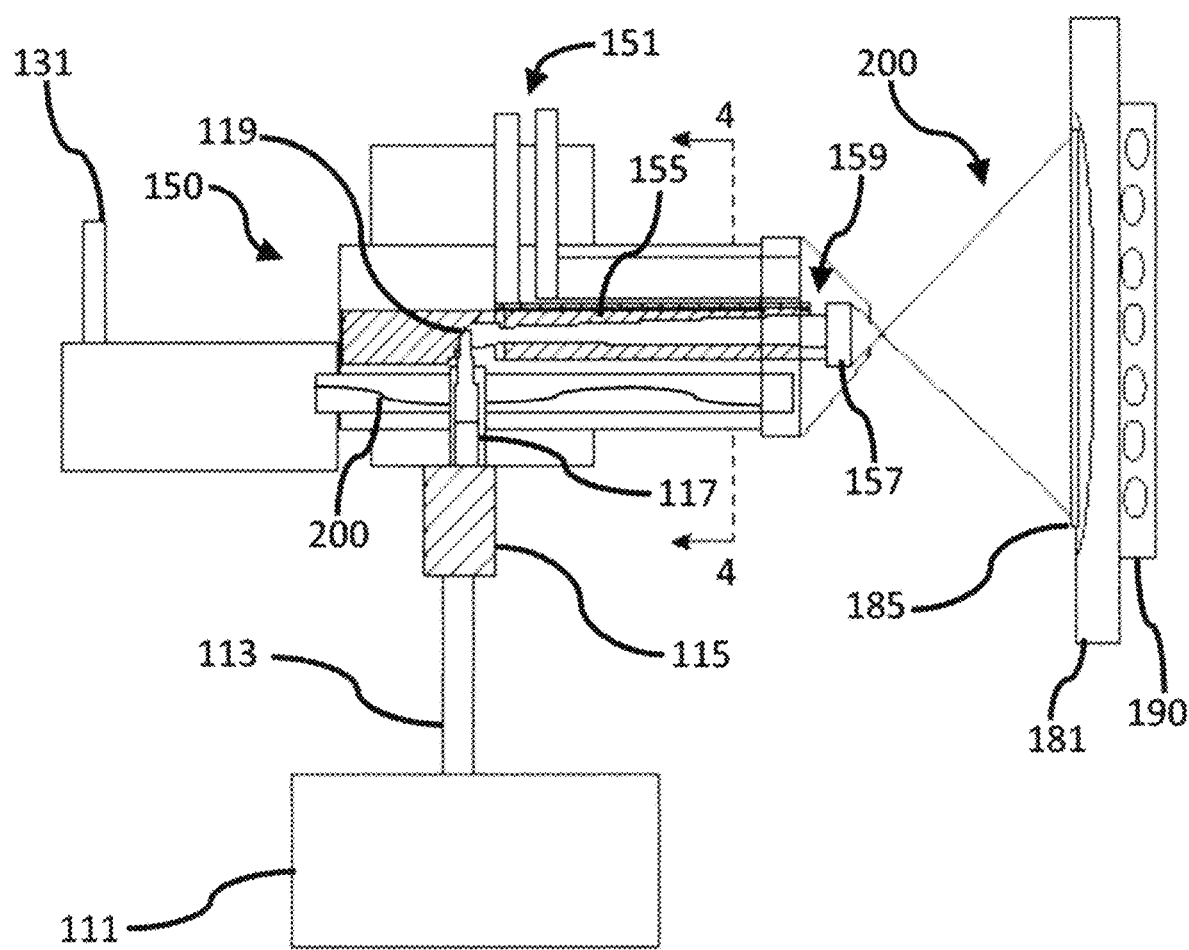
FIG. 3 illustrates a side sectional view of an example delivery spoke suitable for use in association with the chemical vapor deposition reactor of FIGS. 1 & 2.
Figure 4:
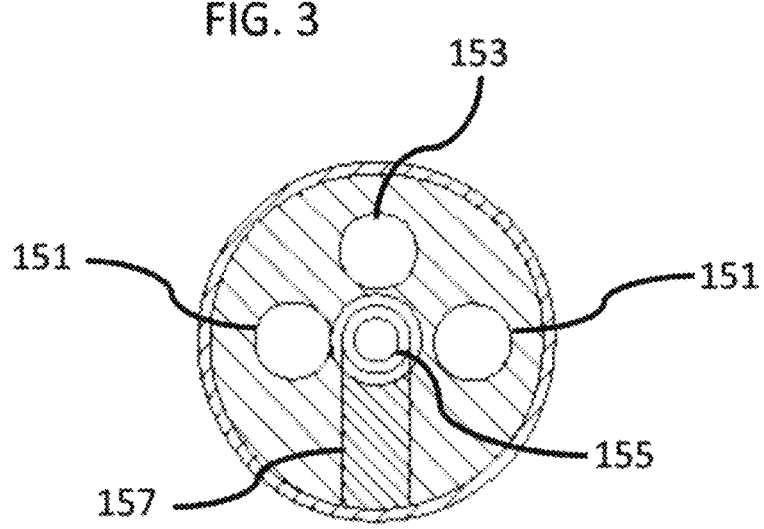
FIG. 4 illustrates a cross-sectional view of the delivery spoke of FIG. 3.

FIG. 3 illustrates a side sectional view of an example delivery spoke suitable for use in association with the chemical vapor deposition reactor of FIGS. 1 & 2 while FIG. 4 illustrates a cross-sectional view of the delivery spoke of FIG. 3.

The laser-enhanced chemical vapor deposition reactor includes one or more pumps or other laser sources 111 configured for irradiating, through spokes 150, deposition sites 185 of a substrate 181 to be coated. For example, reactor 100 includes a laser source for each spoke 150.

Each spoke 150 includes at least one precursor gas bore 151 configured to carry precursor gasses from crucible 130 to a second end distal therefrom and at least one media bore 153 configured to carry media vapor from crucible 130 to the second end. In an example, gas bores 151 are about 5 mm in diameter. Each spoke 150 may further include a venturi nozzle 159 at the second end configured to mix gasses from precursor gas bore 151 and vapor 200 from media vapor bore 153.

An end connector 115 may be provided for inputting the beam emitted from a laser pump and carried to the reaction site by a hollow core optical fiber 113 to a laser beam light pipe 155. In an example, connector 115 is of the SMA 905 or SMA 906 variety.

A metal rod inserted from the first end of each spoke 150 provides an angled mirror interface 119 between one of the laser sources 111 and laser beam light pipe 155. Angled mirror interface 119 is configured to redirect input laser beams from one of the laser sources towards a second end of the spoke. The rod may be formed from any of a variety of materials with melting temperatures sufficient to withstand the operating temperatures of crucible 130. For example, for operating temperatures between 800 and 900° C., suitable materials would have a melting point of greater than 1050° C. In an example, the metal rod is a gold rod having a natural spectral reflectivity of 90+% at the operating wavelengths of 9.3-10 μm and providing for an angle of redirection of about 90°.

A conditioning lens 117 between connector 115 and angled mirror interface 119 is configured to condition an incoming beam such that it matches the optimum acceptance angle of light pipe 155 after reflection from angled mirror interface 119. Conditioning lens 117 may be formed from any of a variety of materials including but not limited to zinc selenide.

Light pipe or waveguide core 155 is configured to transport a laser beam from the first end of a spoke 150 to a second end of the spoke positioned adjacent one of the deposition sites. In an example, light pipe 155 is lined with a gold coating and, in an example, is about 45 mm in length and 3 mm in diameter with an internal diameter of 700-1500 μm. In an example, spoke 150 supports the second end of light pipe 155 at a distance of 25 mm from the deposition site.

A spreader lens 157 at a second end of each spoke 150 is configured to condition a beam delivered by light pipe 155 into a divergent beam substantially covering a reaction area where it supplies heat to enable gas reactions. While spreader lens 157 may be formed from any of a variety of materials suitable for expanding a source beam to a size matching the reaction area, in an example, spreader lens 157 includes zinc selenide. Further, while spreader lens 157 may be formed so as to yield any of a variety of irradiance cone angles suitable for matching the distance from and the diameter of the reaction area, in an example, the irradiance cone angle is about 70 degrees when the deposition site is 35 mm in diameter and the distance from the spreader lens 157 to the deposition site is 25 mm.

Spokes 150 may be formed from any of a variety of materials suitable for hosting gas bores 151 and 153 and one or more light pipes 155 and having a melting point sufficient to withstand operating temperatures of crucible 130. In an example, spokes 150 are formed from quartz tubing. While spokes 150 may take any of a variety of dimensions suitable for extending from crucible 130 to sufficient proximity with the deposition sites and for housing gas bores 151 and 153 and light pipes 155, in an example, spokes 150 are about 16 mm in diameter and extend about 45 mm from crucible 130 towards deposition sites 185.

The laser-enhanced chemical vapor deposition transport system may include any number of spokes 150 suitable for depositing at the desired number of sites simultaneously including but not limited to five spokes. While spokes 150 may be arranged around crucible 130 according to any of a variety of spacing patterns, in an example, spokes 150 are arranged in a regular or equal spacing around the crucible 130 as would be suitable for depositing reflection points for a polygon ring laser resonator.

Figure 5:
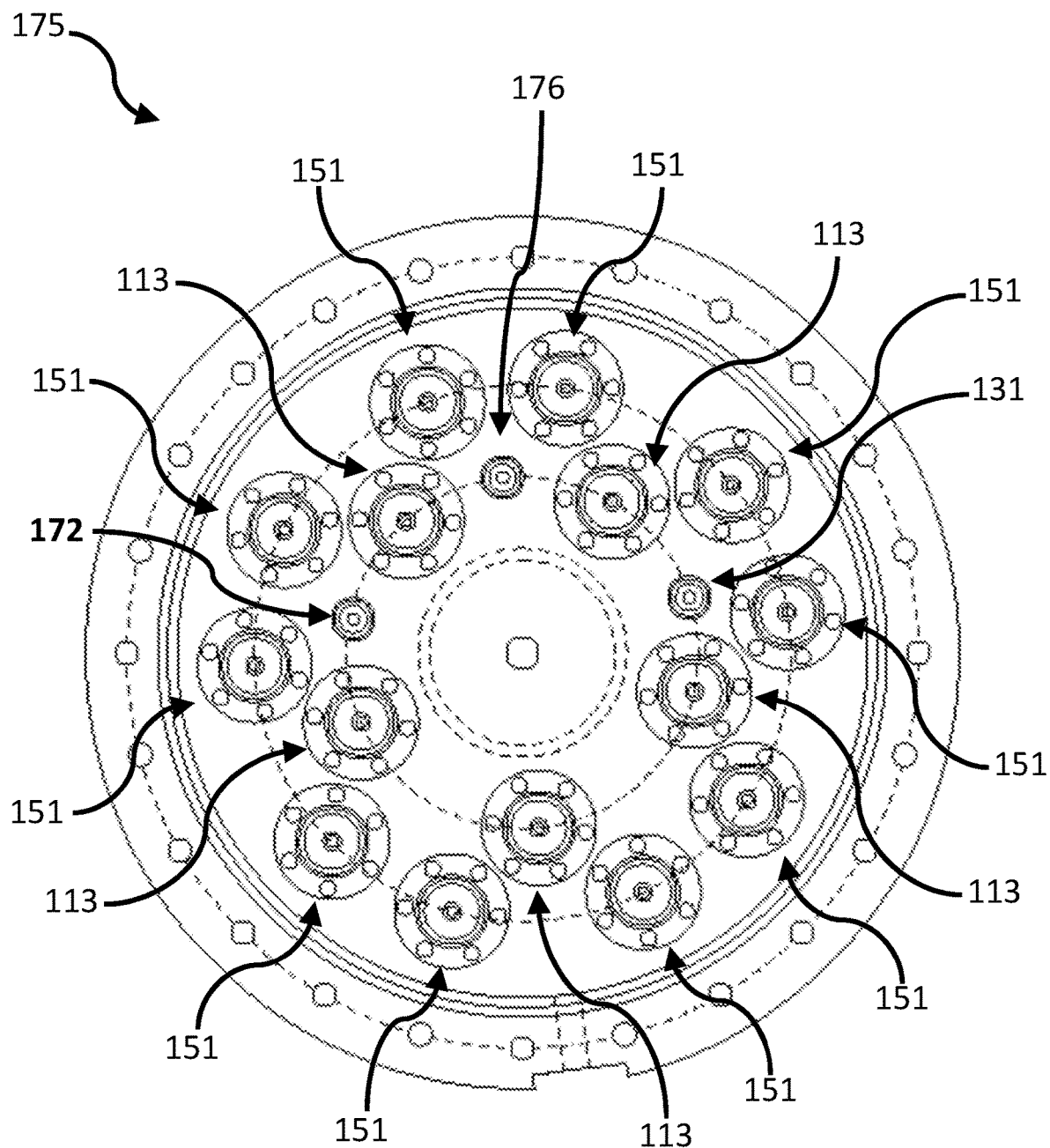
FIG. 5 illustrates a side view of the example chemical vapor deposition reactor of FIGS. 1 & 2.

FIG. 5 illustrates a bottom view of the chemical vapor deposition reactor of FIGS. 1 & 4 showing a number of vacuum flanges enabling input of precursor gasses and laser beams through reactor bottom plate 175 by way of gas bores 151 and optical fibers 113. Reactor 100 may further include an inlet 172 in bottom plate 175 configured to introduce one or more purge gasses to the reactor for transporting reaction biproducts out of the system. A vacuum port 176 in bottom plate 175 may be provided to exhaust biproducts and purge gasses. Inlet 131 is configured to introduce one or more carrier gasses to crucible 130 for transporting media vapor into spokes 150.

Figure 6:
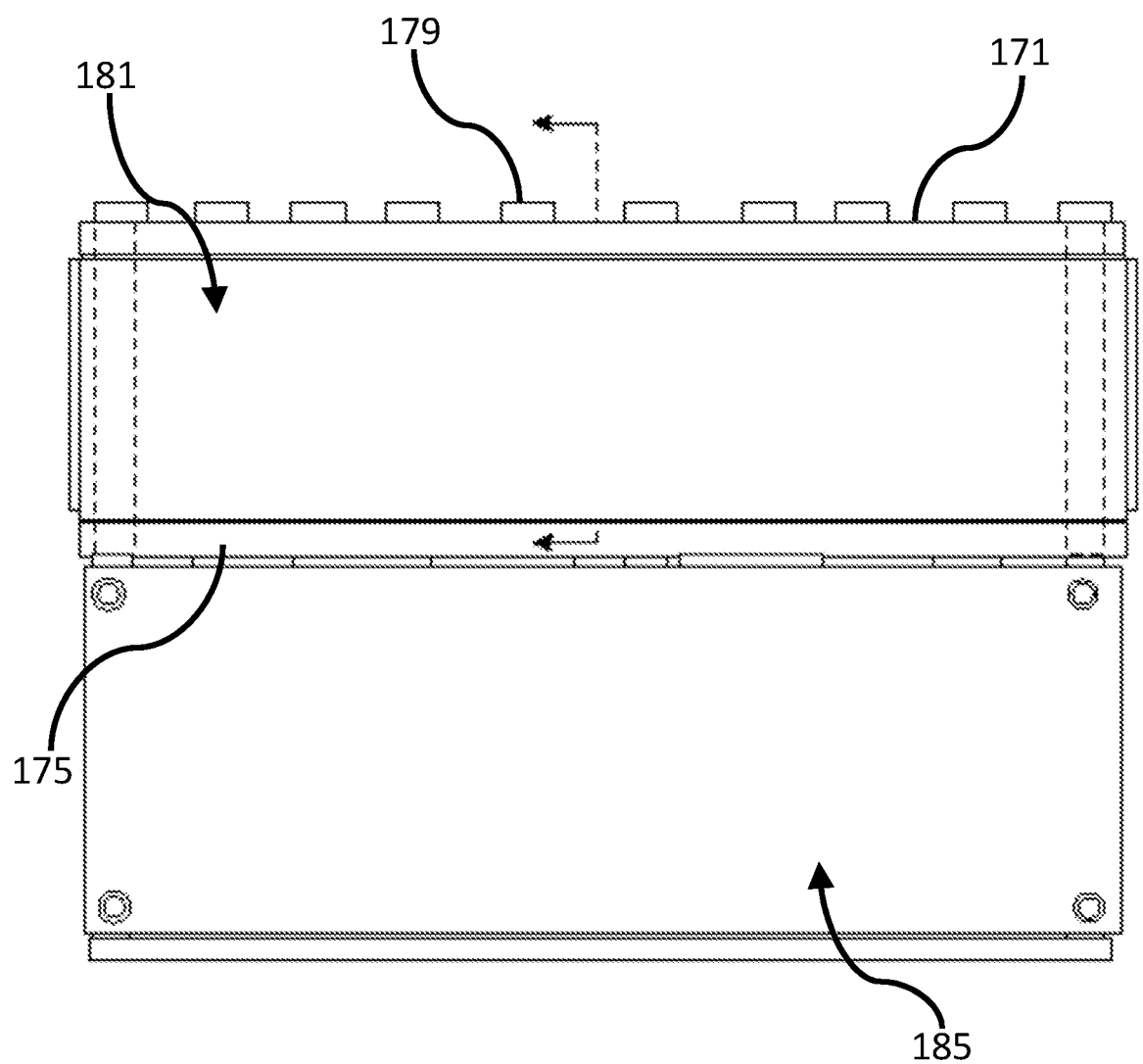
FIG. 6 illustrates a bottom view of the chemical vapor deposition reactor of FIGS.

FIG. 6 illustrates a side view of the example chemical vapor deposition reactor of FIGS. 1, 4 & 5. Top and bottom cover plates 171 and 175 are configured for coupling with a ring substrate 181 to, in cooperation therewith, contain crucible 130 and spokes 150. An interface plate 185 contains and protects supply conduits entering the system and exhaust conduits leaving the system. An external resistive heater 190 (FIGS. 1 & 3) may also be provided for bias heating substrate ring 181.

The very compact and selective nature of this specialized, semi-cold wall laser-enhanced chemical vapor deposition reactor reduces unwanted and wasteful homogeneous reactions which typically takes place in large vacuum reactors. Disclosed reactors may have external diameters as small as 250 mm and volumes as low as 1.57 L. High laser media deposition rates and coating quality are enabled by this advantage. Deposition rates may be improved by an order of magnitude or more. For example, lutetium oxide deposition rates of 2 µm/min may be achieved. Improved adherence, reduced grain and pore size as well as greater uniformity of thickness and greater homogeneity may be realized.

Disclosed example reactors and associated transport systems may find use in any of a variety of methods for laser-enhanced chemical vapor deposition in which precursors gasses are reacted with media vapor at the surface of a substrate.

According to an example method, a resistive heated crucible is provided having a plurality of spokes each projecting from a first end coupled with the crucible to a second end remote from the crucible. The second ends of the spokes are positioned adjacent to target deposition sites. The second ends of the spokes may be so to be substantially perpendicular to exposed surfaces of the deposition sites. To enclose the crucible and spokes, first and second cover plates may be sealed against a ring substrate supporting the sites.

Media is heated in the crucible to vaporization and/or sublimation. In an example, the media includes sesquioxide laser media which may be rare earth doped and/or polycrystalline. In a further example, the sesquioxide laser media includes a powdered ceramic, oxide or fluoride laser media. In a still further example, the laser media is a powdered rare earth doped $LuCl_3$.

The heated media is transported from the crucible through media vapor bores of the spokes to the second ends of the spokes with inert carrier gas input to the crucible by one or more inlets through the top and/or bottom cover plates. Example inert carrier gasses include but are not limited to Ar.

Adjacent to the deposition sites of the ring substrate, the heated media is combined with precursor gasses transported to the second ends though precursor gas bores of the spokes. Example precursors with which the heated ceramic laser media may be combined include $CO_2$ and $H_2$. Additionally and/or alternatively, other precursor gasses may be used depending on media type.

The combining may be enhanced by mixing with venturi nozzles at the second ends of the spokes. The combination is then transported to the reaction areas of the ring substrate through second ends of the spokes.

The reaction areas are irradiated by beams from laser sources for example at a substrate or at a mirror site previously provided to the substrate. The reaction areas of the substrate may be irradiated with lasers of wavelengths outside of reflectance ranges of laser mirrors present at the deposition sites. In an example, the laser sources are $CO_2$ lasers and emit light having 9.4-10.6 µm wavelength at 160 W average power.

Each laser beam may be redirected, by an angled mirror surface, into a first end of a light pipe configured to guide the beams to a second end adjacent to the spoke second end. For example, the beams may approach the reactor perpendicular to the light pipe and require redirection into parallel or so as to be collinear. The angled mirror surface may be supplied by a metal rod inserted from the first end of each spokes. In an example, the light pipes into which the beams are redirected include gold linings.

Each laser beam may be conditioned with a lens such that, when reflected from the angled mirror interface, it matches the optimum acceptance angles of first end of the light pipe. After traversing the length of the waveguide, each beam is conditioned into a divergent beam by a spreader lens adjacent to the spoke second end. In an example, the spreader lenses include zinc selenide.

The beams then irradiate the substrate ring surface and get maximum heating effect due to it being highly absorbent at that laser wavelength. The wavelength of the laser beams reflection from the mirror will be minimal since it is outside of the mirror reflectance design.

Heating of the mixed precursor gasses and media vapor by the laser beams causes amplified and/or enhanced reaction as the deposition sites of the substrate are coated with the media. In an example, the deposition sites coated with the media are located on a substrate ring including aluminum nitride. In an example, the deposition sites are coated up to 500 µm thick with rare-earth-doped lutetium oxide.

Further, the substrate ring may be heated through its external surface with an external resistive heater before the deposition begins for bias heating.

Reaction biproducts may be output through a vacuum port. Output of reaction biproducts may be supported by input of a purge gas to a space between the resistive heated crucible and the ring substrate.

The actions described above with respect to a for method laser-enhanced chemical vapor deposition are only illustrative and other alternatives can also be provided where one or more actions are added, one or more actions are removed, or one or more actions are provided in a different sequence without departing from the scope of the claims herein.

Embodiments of the disclosure are susceptible to being used for various purposes, including, though not limited to, providing users with very high deposition rates, coating purity, and its conformal nature so as to provide a uniform coating over complex shapes such as those arising with polygon ring laser amplifiers. Disclosed laser-enhanced reactors offer spatial resolution and control, limited distortion of the substrate and rapid or non-equilibrium heating and cooling. Vapor deposition of saturable absorber mirror (e.g. graphene) devices may be employed to mode lock for ultra-short laser operation.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A laser-enhanced chemical vapor deposition reactor, comprising:
    a plurality of laser sources;
    a resistive-heated crucible; and
    a plurality of spokes each projecting from the crucible from a first end and including:
        at least one precursor gas bore configured to carry precursor gasses to a second end distal from the first end;
        at least one media vapor bore configured to carry media vapor from the crucible to the second end;
        a laser beam light pipe configured to propagate a beam emitted from the laser sources to the second end;
        a spreader lens at the second end configured to condition the beam into a divergent beam and;
        provided by a metal rod inserted from the first end, an angled mirror interface between one of the laser sources and the laser beam light pipe.

2. The reactor as set forth in claim 1, further comprising at least one carrier gas inlet provided to the crucible.

3. The reactor as set forth in claim 1, further comprising top and bottom cover plates configured for coupling with a ring substrate by which the crucible and spokes are contained.

4. The reactor as set forth in claim 3, further comprising a vacuum port in one of the cover plates configured to output biproducts and purge gas from the reactor.

5. The reactor as set forth in claim 3, further comprising a purge gas inlet in one of the cover plates.

6. A laser-enhanced chemical vapor deposition transport system, comprising:
    a resistive heated crucible; and
    projecting from the crucible at a first end, a plurality of spokes configured to substantially simultaneously:
    deliver media powder vapor from the crucible to a plurality of deposition sites;
    deliver precursor gasses to the deposition sites; and
    propagate beams emitted from one or more laser sources to the deposition sites.

7. The system as set forth in claim 6, wherein each spoke comprises a venturi nozzle at the second end configured to mix gasses from a precursor gas bore and vapor from a media vapor bore.

8. The system as set forth in claim 6, wherein each spoke further comprises an angled mirror interface configured to redirect beams from one of the laser sources towards a second end of the spoke.

9. The system as set forth in claim 6, wherein each spoke further comprises a light pipe configured to transport a laser beam from the first end to a second end adjacent one of the deposition sites.

10. The system as set forth in claim 9, wherein each spoke further comprises a conditioning lens configured to condition one of the beams such that it matches the optimum acceptance angle of the light pipe.

11. A method for laser-enhanced chemical vapor deposition, comprising:
    providing a resistive heated crucible having a plurality of spokes each projecting from a first end coupled with the crucible to a second end remote from the crucible;
    positioning the second ends of the spokes adjacent to deposition sites of a ring substrate;
    heating media in the crucible to vaporization and/or sublimation;
    transporting the heated media from the crucible through media vapor bores of the spokes to the second ends of the spokes with inert carrier gas;
    combining the heated media with precursor gasses adjacent to the deposition sites of the ring substrate;
    transporting the combination to the deposition sites of the ring substrate through second ends of the spokes;
    irradiating the deposition sites by a laser source conditioned into divergent beams by spreader lenses adjacent to the spoke second ends; and
    coating the deposition sites of the ring substrate with the media.

12. The method as set forth in claim 11, further comprising sealing first and second cover plates against the ring substrate to enclose the crucible and spokes.

13. The method as set forth in claim 11, wherein the positioning the second ends of the spokes adjacent to the deposition sites of the ring substrate further comprises positioning such that the spokes are substantially perpendicular to exposed surfaces of the deposition sites.

14. The method as set forth in claim 11, wherein the combining further comprises mixing with venturi nozzles at the second ends of the spokes.

15. The method as set forth in claim 11, wherein the irradiating the deposition sites of the substrate ring further comprises irradiating with lasers of wavelengths outside of reflectance ranges of surfaces at the deposition sites.

16. The method as set forth in claim 11, wherein the irradiating the deposition sites with lasers further comprises, conditioning laser beams with lenses such that they match the optimum acceptance angles of first ends of the light pipes having second ends adjacent to the spoke second ends.

17. The method as set forth in claim 11, wherein the combining the heated media with precursor gasses further comprises combining with precursor gasses transported to the second ends though precursor gas bores of the spokes.

18. The method as set forth in claim 11, further comprising outputting reaction biproducts through a vacuum port.

19. The method as set forth in claim 11, further comprising inputting a purge gas to a space between the resistive heated crucible and the ring substrate.

* * * * *